United States Patent [19]

Mooney et al.

[11] Patent Number: 5,761,624
[45] Date of Patent: Jun. 2, 1998

[54] METHOD AND APPARATUS FOR CONTROLLING AND RECORDING CELLULAR PHONE TRANSACTIONS USING AN INTEGRATED CIRCUIT CARD

[75] Inventors: David M. Mooney, Eden Prairie; James B. Glazier, Hopkins; David E. Wood, Shorewood; Joseph A. Kimlinger, Willernie; Paul Goshgarian, Mound, all of Minn.

[73] Assignee: Integrated Technologies of America, Inc., Edina, Minn.

[21] Appl. No.: 775,114

[22] Filed: Oct. 11, 1991

[51] Int. Cl.$^6$ ............................................. H04Q 7/32
[52] U.S. Cl. .......................................... 455/558; 455/406
[58] Field of Search ................................. 379/59, 91, 111, 379/112, 113, 114, 116, 144, 357; 340/825.33, 825.34; 455/406, 408, 558

[56] References Cited

U.S. PATENT DOCUMENTS

| | | |
|---|---|---|
| 4,718,080 | 1/1988 | Serrano et al. |
| 4,776,003 | 10/1988 | Harris ............................ 379/91 |
| 4,860,336 | 8/1989 | D'Avello et al. ................... 379/91 |
| 4,868,846 | 9/1989 | Kemppi ........................... 379/144 |
| 4,951,308 | 8/1990 | Bishop et al. .................... 379/144 |

FOREIGN PATENT DOCUMENTS

| | | | |
|---|---|---|---|
| 0244164 | 10/1986 | Japan | 379/144 |
| 0286360 | 12/1987 | Japan | 379/357 |
| 0044662 | 2/1989 | Japan | 379/144 |
| 0234550 | 9/1990 | Japan | 379/116 |

OTHER PUBLICATIONS

Integrated Technologies Of America, Inc., "Systems Integration with the Twenty–First Century Computer", Dec. 21, 1990, brochure.

Integrated Technologies of America, Inc., "CPCMS—Cellular Phone Call Management System", May 8, 1991, product brochure.

Spindler, Klaus "The German Cellular Radiotelephone System C", IEEE Communications Magazine, vol. 24, No. 2, Feb. 1986, pp. 22–29.

Kammerlander, Karl "Characteristics of the Cellular Mobile Radio System C450" Telecom report, vol. 8, No. 4, Jul./Aug. 1985, pp. 209–214.

Weib, W. et al. "System 900: The ISDN Approach to Cellular Mobile Radio", Electrical Communication, vol. 63, No. 4, (1989) pp. 400–408.

*Primary Examiner*—Dwayne Bost
*Attorney, Agent, or Firm*—Schwegman, Lundberg, Woessner & Kluth, P.A.

[57] ABSTRACT

A cellular phone call management system using a microprocessor-controlled remote card reader interface for a cellular telephone system to record calls onto a card as they are placed or received. A microprocessor reads information from a card placed in the remote card reader and ensures the card is valid. The cellular telephone's transceiver logic bus is monitored to determine the transaction information of a call as it is placed or received. After the call is completed, the call transaction information is recorded on the card. When all calls are complete, the card is placed in a host card reader attached to a host computer where the call transaction information is read from the card, processed, and written to a host storage device. The call transactions may then be analyzed and reports may be generated and printed by host computer software.

1 Claim, 5 Drawing Sheets

METHOD AND APPARATUS FOR CONTROLLING AND RECORDING CELLULAR PHONE TRANSACTIONS USING AN INTEGRATED CIRCUIT CARD

FIELD OF THE INVENTION

The present invention pertains generally to cellular radio communication systems, and more particularly to a microprocessor-controlled remote card reader interface for a cellular telephone system to record calls onto a card as the calls are placed or received, and host software to process call transactions.

BACKGROUND OF THE INVENTION

The development of fully-duplexed cellular mobile telephone (also known as phone) technology has sparked a dramatic increase in the number of users of mobile telephones. Advances in integrated circuit and battery technology have made possible the availability of transportable and/or portable cellular telephones that operate independant of a vehicle.

Portable cellular telephones communicate by radio contact with cell site transmitting and receiving equipment that has a service area of generally 8 to 12 miles in radius. These cells are tied into conventional telephone switching offices by standard land line facilities.

A portable cellular telephone usually comprises a transceiver and handset that communicate with each other through an internal logic bus. The handset allows an operator to control the transceiver and send or receive information to or from a cell site, either as voice or data.

Since portable cellular telephones may not always be physically mounted and locked in a vehicle, one problem is that of preventing an unauthorized user from accessing the telephone. An additional problem is the inability to track calls for accounting purposes. Even though call information is available in a report from the telephone company, there may be a significant delay between the time the calls are placed and the time the report is received. In addition, the report may not be accurate enough for internal accounting purposes.

Therefore, there is a need to have a way to prevent the unauthorized use of a portable cellular telephone. There is an additional need to provide a way to track and record all calls for accounting purposes.

SUMMARY OF THE INVENTION

The present invention provides for a cellular phone call management system (CPCMS) using a microprocessor-controlled remote card reader interface for a cellular telephone system to record calls onto a card as they are placed or received. A microprocessor reads information from a card placed in the remote card reader and ensures the card is valid. The cellular telephone's transceiver logic bus is monitored to determine the transaction information of a call as it is placed or received. After the call is completed, the call transaction information is recorded on the card. When all calls are complete, the card is placed in a host card reader attached to a host computer where the call transaction information is read from the card, processed, and written to a host storage device. The call transactions may then be analyzed and reports may be generated and printed by host computer software.

The preceding and other features and advantages of the invention will become further apparent from the detailed description that follows. This description is accompanied by a set of drawing figures. Numerals are employed throughout the written description and the drawings to point out the various features of this invention, like numerals referring to like features throughout.

DETAILED DESCRIPTION OF THE PREFERRED EMBODIMENTS

Figure 1:
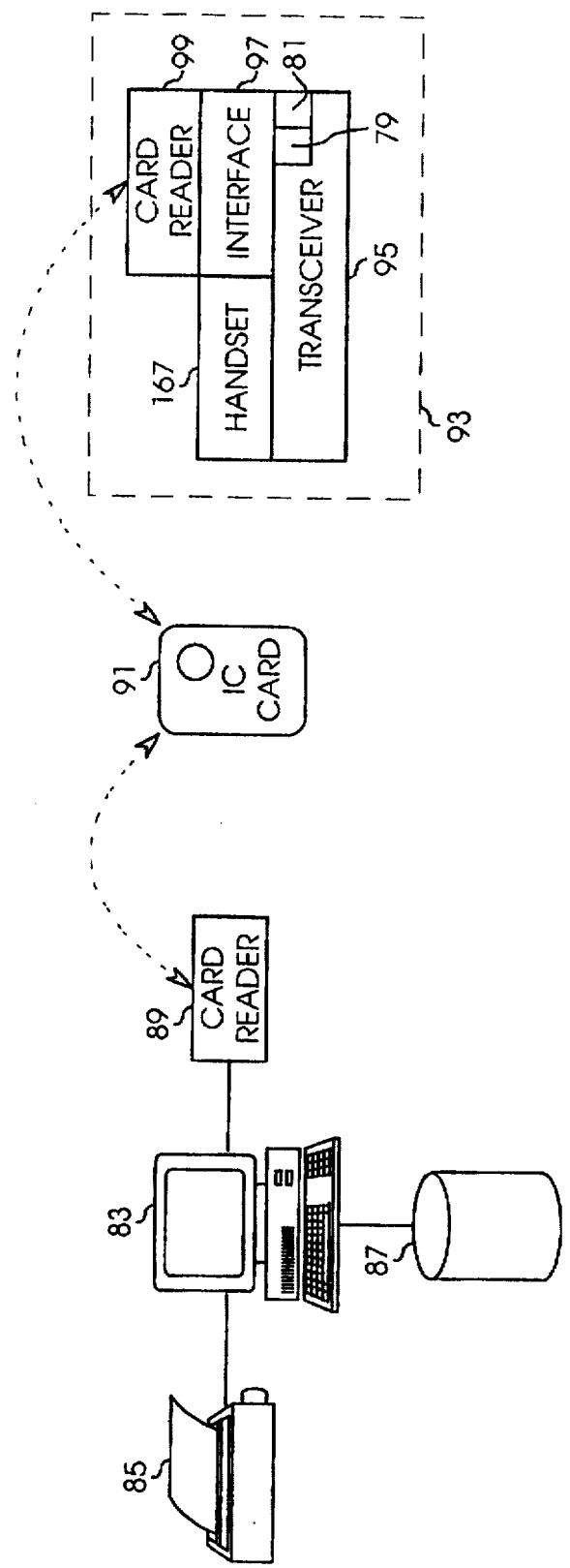
FIG. 1 is a block diagram showing the high-level architecture of a CPCMS according to the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The following is a list of reference numerals and descriptions corresponding to the numerals employed in the accompanying set of drawing figures.

NUMERALS AND DESCRIPTIONS 79 internal fuse connector
81 RJ11 port
83 host computer
85 printer
87 hard disk
89 host card reader
91 integrated circuit (IC) card
93 cellular telephone remote unit
95 transceiver
97 remote card reader interface
99 remote card reader
101 logic and power control
103 transmitter
105 receiver
107 internal battery
109 external power
111 power control
113 power control switch
115 emitter-follower switch
117 1500 ohm emitter resistor
119 shift register
121 serial data line
123 clock/timer line
125 shift register connect lines
127 shift register master reset line
129 counter
131 interrupt line
133 counter master reset line 135 register
137 register enable line
139 select line
141 NAND gate
143 microprocessor
145 register connect lines
147 calendar chip
149 calendar chip connect lines
151 read/write status line
153 data select status line
155 address select status line
157 address/data bus
159 transceiver logic bus
161 handset microprocessor
163 display panel
165 keypad
167 handset
169 interface board clock
171 tri-state amplifier I
173 tri-state amplifier II
175 card power control
177 s1 card detect power contact
178 390 ohm pull-down resistor
179 s2 card detect contact
181 c1 card type contact
183 c2 card clock contact
185 c3 card reset contact
187 c4 card logic voltage supply contact
189 c5 card ground contact
191 c6 card programming contact
193 c7 card serial data contact
194 tri-state amplifier III
195 c8 card type contact
196 tri-state amplifier IV
197 +5 volt voltage source
199 +5 volt pull-up and 15,000 ohm resistor

DETAILED DESCRIPTION

FIG. 1 shows the high-level architecture of a CPCMS. A remote card reader interface 97 connects a custom Amphenol® "Push-Pull" remote card reader 99 to a transceiver 95 and a handset 167 in an Audiovox® CTR-1900 or CTR-1900A transportable cellular telephone remote unit 93. The remote card reader interface 97 taps into the power line of the remote unit 93 via an internal fuse connector 79, and taps into the tranceiver logic bus via an internal connection to a RJ11 port 81. A MICRO CARD® SCOT model 10, model 50, or model 100 integrated circuit (IC) card 91 is placed in the remote card reader 99 where the cellular telephone remote unit 93 is enabled by the remote card reader interface 97, and calls are recorded as they are placed or received. The card may also be a standard magnetic stripe card if an alternative card reader is used. After the caller completes all calls, the card 91 is placed in a MICRO CARD® CTU520™ or QuikLINK™ model TLP0720 host card reader 89 connected to a host IBM compatible personal computer 83 where information is read from the card 91, processed, and written to a host hard disk 87. The information is then analyzed and reports are generated by the host computer 83, and the reports are output to a printer 85.

Figure 2:
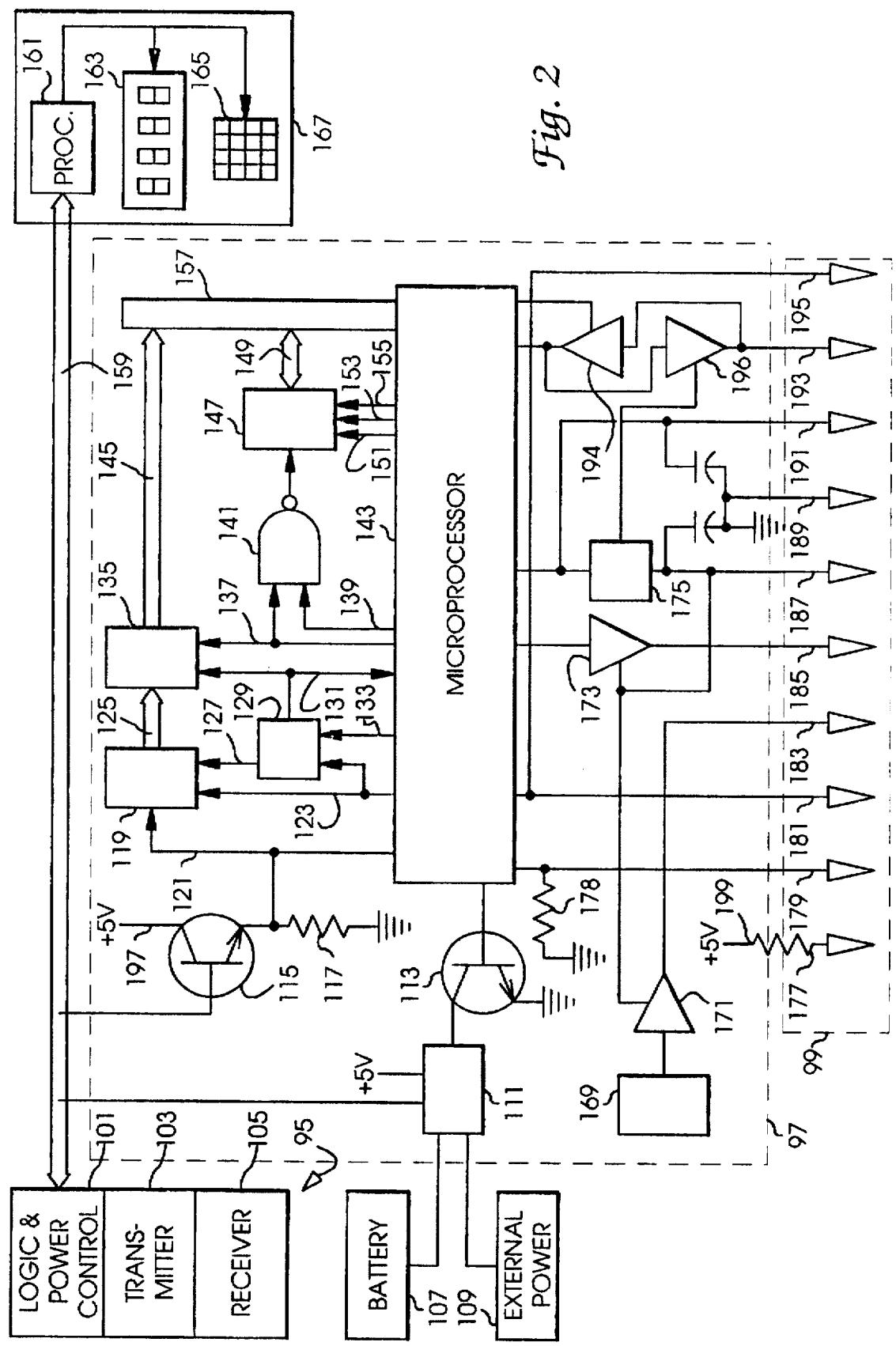
FIG. 2 is a schematic diagram showing the microprocessor-controlled remote card reader interface for a CPCMS according to the present invention.

FIG. 2 illustrates a schematic diagram of the microprocessor-controlled remote card reader interface for a cellular telephone remote unit. Transceiver 95 contains a transmitter 103 and receiver 105 attached to logic and power control 101. A transceiver logic bus 159 connects the logic and power control 101 to a handset microprocessor 161 in handset 167. The handset microprocessor 161 receives operator input from a keypad 165 and displays status to the operator via a display panel 163.

Power control 111 selects between internal battery 107 and external power 109. External power 109 is always used if it is available. A power control switch 113 enables or disables the remote unit by turning power on or off to the transceiver logic bus 159, and thereby to the entire remote unit.

An emitter-follower switch 115 allows serial data from the transceiver logic bus 159 to be converted to parallel data with a shift register 119, and to pass serial data to a microprocessor 143 via serial data line 121. A +5 volt voltage source 197 is used with a 1500 ohm emitter resistor 117 in order not to load the transceiver logic bus 159. A clock/timer line 123 synchronizes the shift register 119 and a counter 129. A master reset is sent to the counter 129 by counter master reset line 133, and to the shift register 119 by shift register master reset line 127. When the counter 129 reaches eight, an interrupt is sent by interrupt line 131 to the microprocessor 143 and to a register 135.

One byte of data is transferred from the shift register 119 to the register 135 via shift register connect lines 125. A register enable line 137 allows the register 135 to transfer one byte of data to the microprocessor 143 via register connect lines 145 and address/data bus 157. A select line 139 and the register enable line 137 are used by a NAND gate 141 to enable a calendar chip 147 to send time/date information to the microprocessor 143 via calendar chip connect lines 149 and address/data bus 157. The microprocessor controls the calendar chip 147 by a read/write status line 151, a data select status line 153, and an address select status line 155.

A tri-state amplifier 171 enables an interface board clock 169 and provides a clock to the card via card clock contact 183 when a card is present. The microprocessor 143 detects a card by a +5 volt pull-up and 15,000 ohm resistor 199 applying a voltage through a card detect power contact 177 and completing the circuit through a card detect contact 179, which includes a 390 ohm pull-down resistor 178. A tri-state amplifier 173 enables the microprocessor 143 to reset the card via card reset contact 185. Card type contacts 181 and 195 are used to determine what type of IC card has been inserted into the remote card reader 99. A card power control 175 supplies voltage to the card logic voltage supply contact 187 and card via card programming contact 191, and the card is grounded via card ground contact 189. The microprocessor 143 sends or receives data to or from the card via a card serial data contact 193 and two tri-state voltage amplifiers 194 and 196.

If the card contains lock-out information, the microprocessor 143 prevents the operator from making calls to special numbers or area codes by disabling the remote unit 93. If the card is identified as a maintenance card, the microprocessor 143 allows the operator to perform system functions such as change the date and time stored in calendar chip 147, run a memory check on microprocessor 143, and other system functions by entering codes with the keypad 165.

Figure 3A:
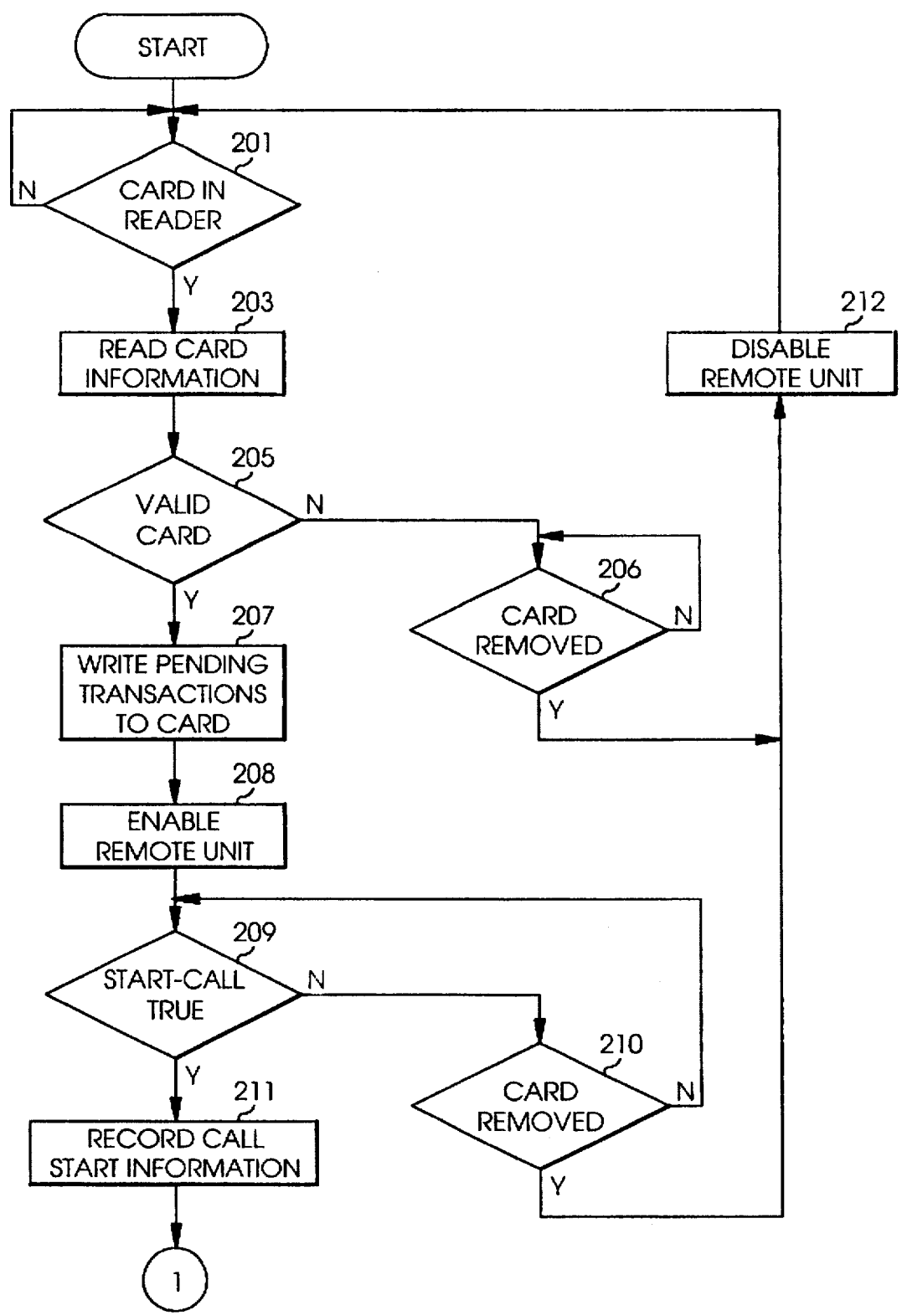
FIGS. 3a and b comprise a flow diagram showing the steps taken to record calls placed or received on a CPCMS according to the present invention.
Figure 3B:
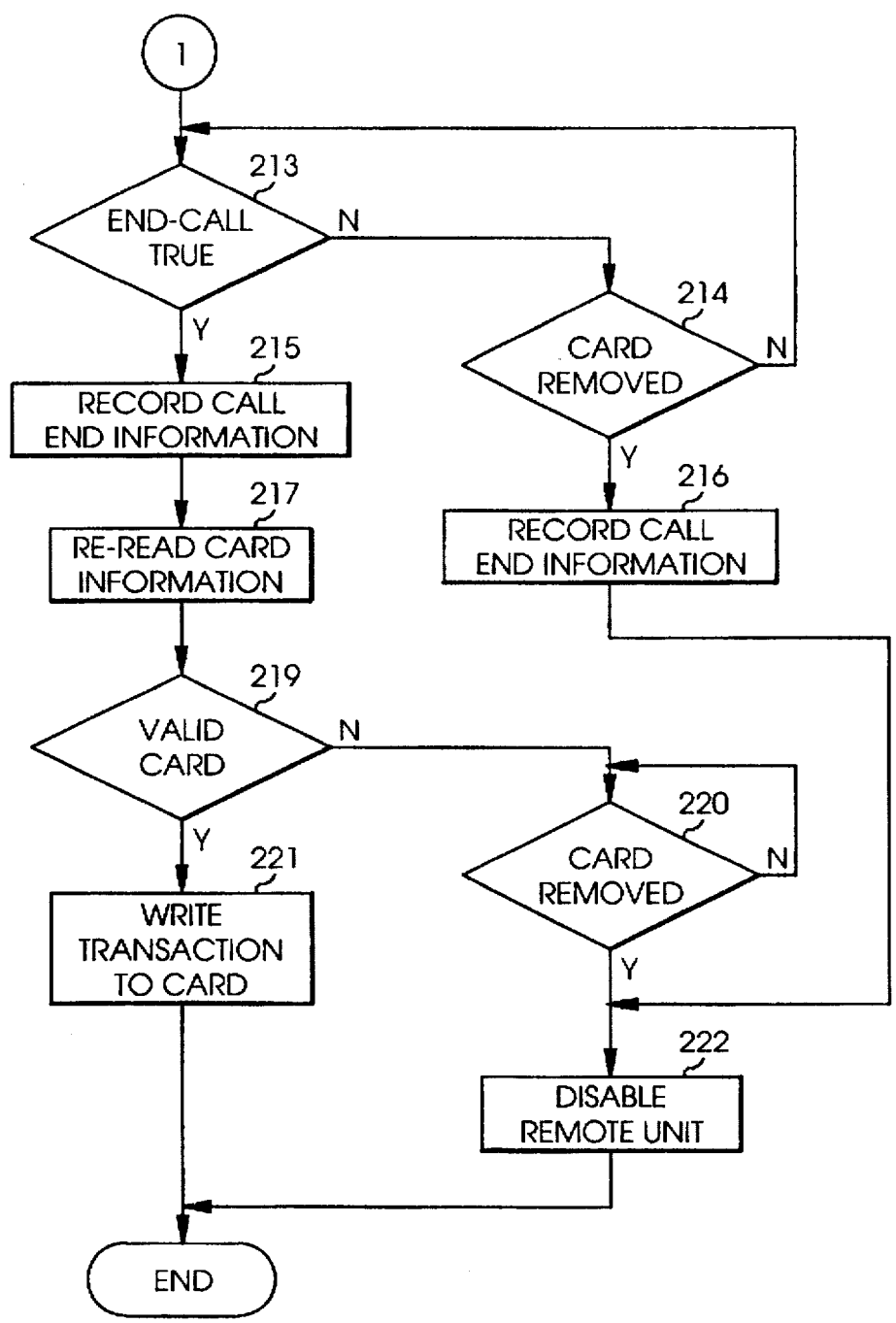

FIG. 3 describes the steps taken to record calls placed or received on the cellular telephone remote unit. At 201 the remote card reader is checked to see if a card is present. If so, card validation information is read at 203 and verified at 205 to make sure the card is valid. If the card is not valid, the remote card reader is checked at 206 to see if the card has been removed. When the card has been removed, the remote unit is disabled at 212 and control returns to 201. If at 205 the card is valid, any pending call transactions are written to the card at 207 and the remote unit is enabled at 208. At 209 the tranceiver logic bus is monitored for a telephone start-call indicator to become true to indicate the start of a call. On the transportable remote unit, the start-call indicator corresponds to an "in-use" indicator, but the start-call indicator may also correspond to other combinations of remote unit indicators or conditions. If the start-call indicator is false, the remote card reader is checked at 210 to see if the card has been removed. If the card has been removed, the remote unit is disabled at 212 and control returns to 201. If the card has not been removed, control returns to 209. If at 209 the start-call indicator is true, the start information of the call such as the outgoing call number, call type, month, day, hour, minute, and second is stored in memory at 211, and the tranceiver logic bus is monitored at 213 for a telephone end-call indicator to become true. On the transportable remote unit, the end-call indicator corresponds to an "in-use" indicator becomming false, but the end-call indicator may also correspond to other combinations of remote unit indicators or conditions. If the end-call indicator is false, the remote card reader is checked at 214 to see if the card has been removed. If the card has been removed, the end information of the call such as the remote unit number, month, day, hour, minute, and second is stored in memory at 216, the remote unit is disabled at 222 and the call transaction information is left in memory as a pending call transaction. The call type for the start information can be either local, long-distance, roam, or other call types. If the card has not been removed, control returns to 213. If at 213 the end-call indicator becomes true, the end information of the call is stored in memory at 215. Card validation information is re-read at 217 and checked at 219 to see if the card is still valid. If the card is not valid, the remote card reader is checked at 220 to see if the card has been removed. When the card has been removed, the remote unit is disabled at 222 and the call transaction information is left in memory as a pending call transaction. If at 219 the card is valid, the call transaction is written to the card at 221.

Figure 4:
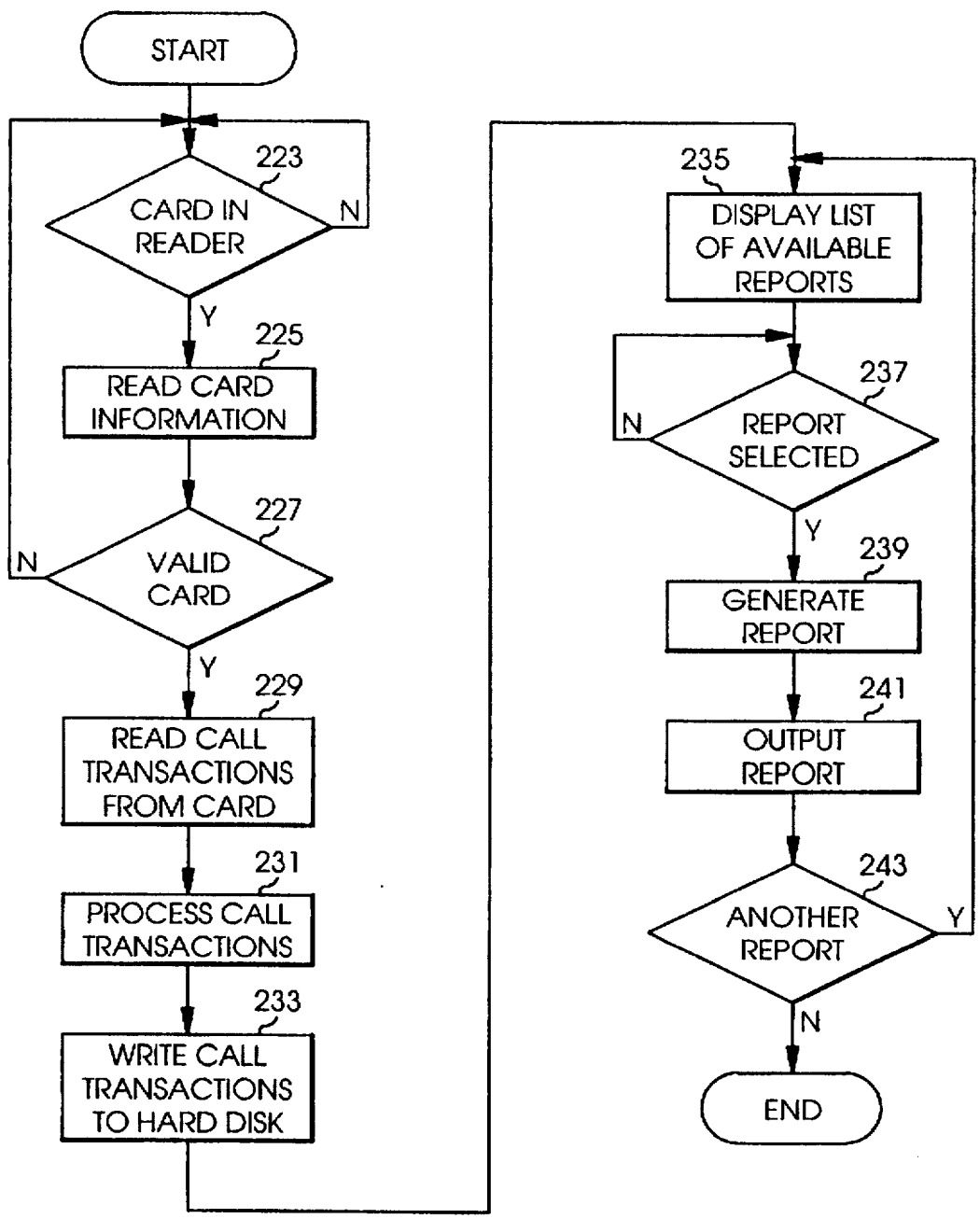
FIG. 4 is a flow diagram showing the steps taken to process call transactions with a host computer according to the present invention.

FIG. 4 reveals the steps taken to process call transactions with the host computer. At 223 the host card reader is checked to see if a card is present. If so, card validation information is read at 225 and checked at 227 to see if the card is valid. If the card is not valid, control returns to 223. If the card is valid, call transactions are read from the card at 229, processed at 231 where billing rate, tax rate, and other information is calculated, and the call transactions are written to the hard disk at 233. At 235 a list of available reports is displayed to the operator. The operator selects one of the reports at 237, and software on the host computer generates the reports at 239 and outputs the reports at 241, either to the screen of the host computer, the attached printer, or any other output devices. If the operator decides at 243 to generate and output more reports, control returns to 235.

In summary, this description has revealed how to connect a remote card reader, a remote card reader interface, and a cellular telephone remote unit together, and has also shown the procedure used in order to enable or disable the remote unit with a valid IC card and record transaction information on calls placed or received onto the IC card. It has further been shown how to use a host computer, a host card reader, a hard disk, and a printer to upload, process, analyze, and print reports of call transaction data recorded onto the IC card.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. An apparatus for controlling and recording cellular phone call transactions for use in a cellular telephone system, the system containing a remote unit having a radio transceiver a handset and a logic bus, the apparatus comprising:

(a) remote card reader interface means for writing and reading information to and from and integrated circuit card placed in the remote card reader;

(b) logic bus interface means for connecting a processing means to the logic bus of the transceiver;

(c) processing means connected to the logic bus interface means and remote card reader interface means for processing information observed on the logic bus or read from the card, said information including phone call transaction information;

(d) the processing means including means for controlling the remote unit in response to information read from the card and for writing phone call transaction information to an integrated circuit card placed in the remote card reader, the phone call transaction information including at least the phone number and duration for each call processed by on the remote unit; and (e) the processing means further comprises means for allowing an operator to perform system functions in response to information read from a maintenance card.

* * * * *

UNITED STATES PATENT AND TRADEMARK OFFICE
CERTIFICATE OF CORRECTION

PATENT NO. : 5,761,624
DATED : June 2, 1998
INVENTOR(S) : David M. Mooney, et al.

It is certified that error appears in the above-identified patent and that said Letters Patent is hereby corrected as shown below:

On the title page and Column 1, Line 2;

Item [54], delete "CONTROLLING AND RECORDING"

Col. 6, line 31, claim 1, please delete "transceiver a" and insert --transceiver, a--.

Col. 6, line 33, claim 1(a), please delete "to and from and integrated" and insert --to and from an integrated--.

Signed and Sealed this

Fourth Day of May, 1999

Attest:

Q. TODD DICKINSON

*Attesting Officer*    *Acting Commissioner of Patents and Trademarks*